(12) United States Patent
Hayaishi

(10) Patent No.: US 7,720,279 B2
(45) Date of Patent: May 18, 2010

(54) SPECIFYING FLESH AREA ON IMAGE

(75) Inventor: Ikuo Hayaishi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 974 days.

(21) Appl. No.: 11/076,420

(22) Filed: Mar. 8, 2005

(65) Prior Publication Data
US 2005/0244053 A1 Nov. 3, 2005

(30) Foreign Application Priority Data
Mar. 10, 2004 (JP) ............................. 2004-066575
Feb. 15, 2005 (JP) ............................. 2005-038020

(51) Int. Cl.
G06K 9/34 (2006.01)
G06K 9/40 (2006.01)
G06K 9/46 (2006.01)
G06K 9/66 (2006.01)

(52) U.S. Cl. ....................... 382/164; 382/190; 382/262; 382/264

(58) Field of Classification Search ................. 382/118, 382/164, 173, 224, 190, 260–264; 358/538
See application file for complete search history.

(56) References Cited

U.S. PATENT DOCUMENTS

| 5,974,197 | A * | 10/1999 | Lee et al. ..................... 382/268 |
| 6,128,407 | A * | 10/2000 | Inoue et al. .................. 382/167 |
| 6,229,578 | B1 * | 5/2001 | Acharya et al. .............. 348/607 |
| 6,728,473 | B1 * | 4/2004 | Chotoku et al. ............... 386/95 |
| 6,788,304 | B1 * | 9/2004 | Hart et al. .................... 345/586 |
| 2002/0159630 | A1 * | 10/2002 | Buzuloiu et al. ............ 382/165 |
| 2003/0053663 | A1 * | 3/2003 | Chen et al. .................. 382/117 |
| 2003/0053685 | A1 * | 3/2003 | Lestideau .................... 382/164 |
| 2003/0156301 | A1 * | 8/2003 | Kempf et al. ................ 358/486 |
| 2004/0208388 | A1 * | 10/2004 | Schramm et al. ............ 382/254 |
| 2004/0264780 | A1 * | 12/2004 | Zhang et al. ................ 382/224 |
| 2008/0129863 | A1 * | 6/2008 | Neuman et al. ............. 348/448 |

FOREIGN PATENT DOCUMENTS

| JP | 2000003452 A | * | 1/2000 |
| JP | 2000-059629 | | 2/2000 |
| JP | 2000-188768 | | 7/2000 |

OTHER PUBLICATIONS

El-Khamy et al. (Neural Network Face Recognition Using Statistical Feature and Skin Texture Parameters, 8th National Radio Science Conference, Mar. 27-29, 2001, pp. 233-240).*

(Continued)

*Primary Examiner*—Yubin Hung
(74) *Attorney, Agent, or Firm*—Martine Penilla & Gencarella, LLP

(57) ABSTRACT

A CPU 411 divides image data GD into a plurality of areas (pixel data groups), analyzes the data in image data area units, and determines the color value and dispersion value of the image data areas. When the determined color value is within a flesh toned color area and the dispersion value is at or below a reference dispersion value, the CPU 411 determines the target image data area to be a flesh area. The CPU 411 carries out a smoothing process on the image data area determined to be a flesh area.

11 Claims, 15 Drawing Sheets

OTHER PUBLICATIONS

Edwin et al. (JP-2000-003452, English abstract only).*

Yang et al. ("Detecting Faces in Images: A Survey," IEEE Trans. Pattern Analysis and Machine Intelligence, vol. 24, No. 1, Jan. 2002, pp. 34-58).*

Fang et al. ("A Color Histogram Based Approach to Human Face Detection," IEEE Int'l Conf. on Visual Information Engineering, Jul. 7-9, 1993, pp. 133-136).*

Graf et al. ("Robust recognition of faces and facial features with a multi-modal system", Proceedings of the Int'l Conference on Computational Cybernetics and Simulation (1997), V.3, 2034-2039)—discloses using multiple features such as color and texture to locate faces.*

Flaig et al. ("Affine Order-Statistic Filters: Medianization of Linear FIR Filters," IEEE Transaction on Signal Processing, vol. 46, No. 8, Aug. 1998, pp. 2101-2112).*

Abstract of Japanese Patent Publication No. 2000-059629, Pub. Date: Feb. 25, 2000, Patent Abstracts of Japan.

Abstract of Japanese Patent Publication No. 2000-188768, Pub. Date: Jul. 4, 2000, Patent Abstracts of Japan.

* cited by examiner

| -1 | 0 | 1 |
|---|---|---|
| -1 | 0 | 1 |
| -1 | 0 | 1 |

| 1 | 1 | 1 |
|---|---|---|
| 0 | 0 | 0 |
| -1 | -1 | -1 |

| -1 | 0 | 0 | 0 | 1 |
|---|---|---|---|---|
| 0 | 0 | 0 | 0 | 0 |
| -1 | 0 | 0 | 0 | 1 |
| 0 | 0 | 0 | 0 | 0 |
| -1 | 0 | 0 | 0 | 1 |

| 1 | 0 | 1 | 0 | 1 |
|---|---|---|---|---|
| 0 | 0 | 0 | 0 | 0 |
| 0 | 0 | 0 | 0 | 0 |
| 0 | 0 | 0 | 0 | 0 |
| -1 | 0 | -1 | 0 | -1 |

22.5°

45.0°

67.5°

90.0°

112.5°

135.0°

157.5°

180.0°

| TARGET PIXEL | PROCESSED PIXEL VALUE IN EMBODIMENT | PROCESSED PIXEL VALUE IN PRIOR ART | GRADIENT ORIENTATION $\theta$ |
|---|---|---|---|
| TP | 128 (BRIGHTNESS)/ 64 (COLOR DIFFERENCE) | 111 (BRIGHTNESS)/ 55 (COLOR DIFFERENCE) | 51° |
| TPn1 | 128 (BRIGHTNESS)/ 64 (COLOR DIFFERENCE) | 101 (BRIGHTNESS)/ 50 (COLOR DIFFERENCE) | 56° |
| TPn2 | 96 (BRIGHTNESS)/ 48 (COLOR DIFFERENCE) | 83 (BRIGHTNESS)/ 41 (COLOR DIFFERENCE) | 69° |

SPECIFYING FLESH AREA ON IMAGE

BACKGROUND OF THE INVENTION

1. Field of the Invention

The present invention relates to a technique that specifies flesh areas contained in an image, and a technique that implements a smoothing process on image data corresponding to flesh areas.

2. Description of the Related Art

As the resolution of digital still cameras grows ever higher, so too do pigmentation spots, age spots, and blemishes become more conspicuous in the flesh areas of images that are produced. After a photograph has been taken, a process for adjusting picture quality can be readily implemented on the digital image data produced by digital still cameras. Practical use is now being made of techniques for reducing or eliminating parts where faithfully reproducing pigmentation spots, age spots, and blemishes in the flesh areas of an image would be undesirable.

Specifically, flesh areas in the image can be specified, and a smoothing process can be implemented on image data corresponding to the flesh areas to reduce or eliminate such spots and the like in the flesh areas.

However, a problem in conventional techniques or specifying flesh areas is the low accuracy in identifying flesh areas because such flesh areas are determined based on the presence of parts forming the face, such as the eyes and mouth, or the shape of the areas. Low accuracy in identifying flesh areas results in the smoothing process being carried out on areas that do not represent flesh, and thus in lower image reproduction accuracy, that is, lower picture quality. An example of a resulting problem is that a flesh toned sweater could be identified as a flesh area, and the coarse texture of the sweater could be eliminated.

SUMMARY OF THE INVENTION

An object of the present invention, which is intended to overcome the above problems, is to allow flesh areas in an image to be more accurately specified, and to make such flesh areas look more attractive.

A first aspect of the invention for solving the above problems provides an image processing apparatus that specifies flesh areas in an image. The image processing apparatus of the first aspect of the invention comprises: image data acquiring module that acquires image data, which is data of the target image; image data dividing module that divides the image data into a plurality of image data areas according to the plurality of areas into which the image is divided; color area property acquiring module that analyzes the image data in image data area units and acquires color area properties exhibited by the image data areas; texture property acquiring module that analyzes the image data in image data area units and acquires texture properties exhibited by the image data areas; and flesh area specifying module that specifies image data areas corresponding to flesh areas among the image data areas using the acquired color area properties and texture properties.

In the image processing apparatus of the first aspect of the invention, image data is analyzed in image data area units, the color area properties and texture properties exhibited by the image data areas are acquired, and the acquired color area properties and texture properties are used to specify the image data areas corresponding to the flesh areas among the image data areas. Flesh areas in an image may thus be specified with high accuracy.

Image data areas exhibiting flesh tone color area properties and smooth texture properties may be specified as image data areas corresponding to flesh areas by the flesh area specifying module in the image processing apparatus of the first aspect of the invention. Because these conditions are the color area properties and texture properties with which flesh areas are generally endowed, it may be properly determined whether the image data areas correspond to flesh areas.

In the image processing apparatus of the first aspect of the invention, the flesh area specifying module may further comprises photographed subject area forming module that forms photographed subject areas by associating adjacent image data areas exhibiting the same color area properties and texture properties. The flesh area specifying module may specify image data areas corresponding to flesh areas by specifying photographed subject areas that exhibit flesh tone color area properties and smooth texture properties. In such cases, face areas in particular may be determined more accurately among flesh areas.

In the image processing apparatus of the first aspect of the invention, the color area properties may include hue, saturation, and brightness as parameters, the texture properties may include dispersion as a parameter, the image data areas may be composed of a plurality of pixel data, and the flesh area specifying module may determine that the color area properties of the image data areas are flesh toned when the proportion of the number of pixel data exhibiting flesh tone color areas relative to the total number of pixel data in the image data areas is at or over the color area reference value, and may determine that the texture properties of the image data areas are smooth when the dispersion value in the image data areas is lower than the dispersion reference value. In such cases, the color area properties and texture properties of image data areas may be accurately acquired (determined).

The image processing apparatus of the first aspect of the invention may further comprise smoothing process module that implements a smoothing process on image data areas corresponding to flesh areas that have been determined. In such cases, the picture quality of image data areas corresponding to flesh areas may be improved, and flesh areas may be made to look more attractive.

In the image processing apparatus of the first aspect of the invention, the areas may be composed of one pixel, and the plurality of image data areas corresponding to the areas may be composed of one pixel datum, or the areas may be composed of a plurality of pixels, and the plurality of image data areas corresponding to the areas may be composed of a plurality of image data.

A second aspect of the invention provides an image processing apparatus that specifies flesh areas. The image processing apparatus of the second aspect of the invention comprises: image data acquiring module that acquires image data composed of a plurality of pixel data; image data dividing module that divides the image data into a plurality of pixel data groups; color value acquiring module that analyzes the image data in pixel data group units and acquires, as the color value, the proportion of the number of pixel data exhibiting flesh tone color areas relative to the total number of pixel data in the pixel data groups; dispersion value acquiring module that analyzes the image data in pixel data group units and acquires the dispersion value exhibited by the pixel data groups; and flesh tone area specifying module that specifies pixel data groups corresponding to flesh areas among the pixel data groups using the acquired color value and dispersion value.

In the image processing apparatus of the second aspect of the invention, the image data is analyzed in pixel data group units, the proportion of the number of pixel data exhibiting flesh tone color areas relative to the total number of pixel data in the pixel data groups is acquired as the color value, the dispersion value exhibited by the pixel data groups is acquired, and the acquired color value and dispersion value may be used to specify pixel data groups corresponding to flesh areas among the pixel data groups. Flesh areas in an image may thus be specified with high accuracy.

In the image processing apparatus of the second aspect of the invention, pixel data groups with a color value at or over the color area reference value and a dispersion value lower than the dispersion reference value may be specified as flesh areas by the flesh area specifying module. Because these conditions are the color area properties and texture properties with which flesh areas are generally endowed, it may be properly determined whether or not the image data areas correspond to flesh areas.

In the image processing apparatus of the second aspect of the invention, the flesh area specifying module may further comprise photographed subject area forming module that forms photographed subject areas by associating adjacent pixel data groups exhibiting the same color value and dispersion value, and the flesh area specifying module may specify pixel data groups corresponding to flesh areas by specifying photographed subject areas in which the dispersion value is lower than the dispersion reference value and the proportion of the number of pixel data included in flesh toned color areas in the photographed subject areas, among the photographed areas that have been formed, is at or over the color area reference value. In such cases, face areas in particular may be determined more accurately among flesh areas.

The image processing apparatus of the second aspect of the invention may further comprise smoothing process module that implements a smoothing process on pixel data groups corresponding to the flesh areas that have been determined. In such cases, the picture quality of image data areas corresponding to flesh areas may be improved, and flesh areas may be made to look more attractive.

A third aspect of the invention provides an image processing method that specifies flesh areas in an image. The third aspect of invention includes acquiring image data that is data of the target image; dividing the image data into a plurality of image data areas according to the plurality of areas into which the image is divided; analyzing the image data in image data area units and acquiring color area properties exhibited by the image data areas; analyzing the image data in image data area units and acquiring texture properties exhibited by the image data areas; and specifying image data areas corresponding to flesh areas among the image data areas using the acquired color area properties and texture properties.

The image processing method of the third aspect of the invention may provide the same action and effects as the image processing apparatus in the first aspect of the invention. The image processing method of the third aspect of the invention may also be realized in various ways in the same manner as the image processing apparatus in the first aspect of the invention.

A fourth aspect of the invention provides an image processing method that specifies flesh areas. The fourth aspect of the invention includes acquiring image data composed of a plurality of pixel data; dividing the image data into a plurality of pixel data groups; analyzing the image data in pixel data group units acquiring, as the color value, the proportion of the number of pixel data exhibiting flesh tone color areas relative to the total number of pixel data in the pixel data groups; analyzing the image data in pixel data group units acquiring the dispersion value exhibited by the pixel data groups; and specifying pixel data groups corresponding to flesh areas among the pixel data groups using the acquired color value and dispersion value.

The image processing method of the fourth aspect of the invention may provide the same action and effects as the image processing apparatus in the second aspect of the invention. The image processing method of the fourth aspect of the invention may also be realized in various ways in the same manner as the image processing apparatus in the second aspect of the invention.

The methods in the third and fourth aspects of the invention may also be realized in the form of programs, and computer-readable recording media on which such programs have been recorded.

BRIEF DESCRIPTION OF THE DRAWINGS

FIGS. 9(a) and 9(b) illustrate an example of a 3×3 edge detection operator used to determine the edge gradient g (edge level).

FIGS. 10(a) and 10(b) illustrate an example of a 5×5 edge detection operator used to determine the edge gradient g (edge level).

DESCRIPTION OF THE PREFERRED EMBODIMENTS

The image processing apparatus and image processing methods of the invention are illustrated in the following embodiments with reference to the drawings.

Figure 1:
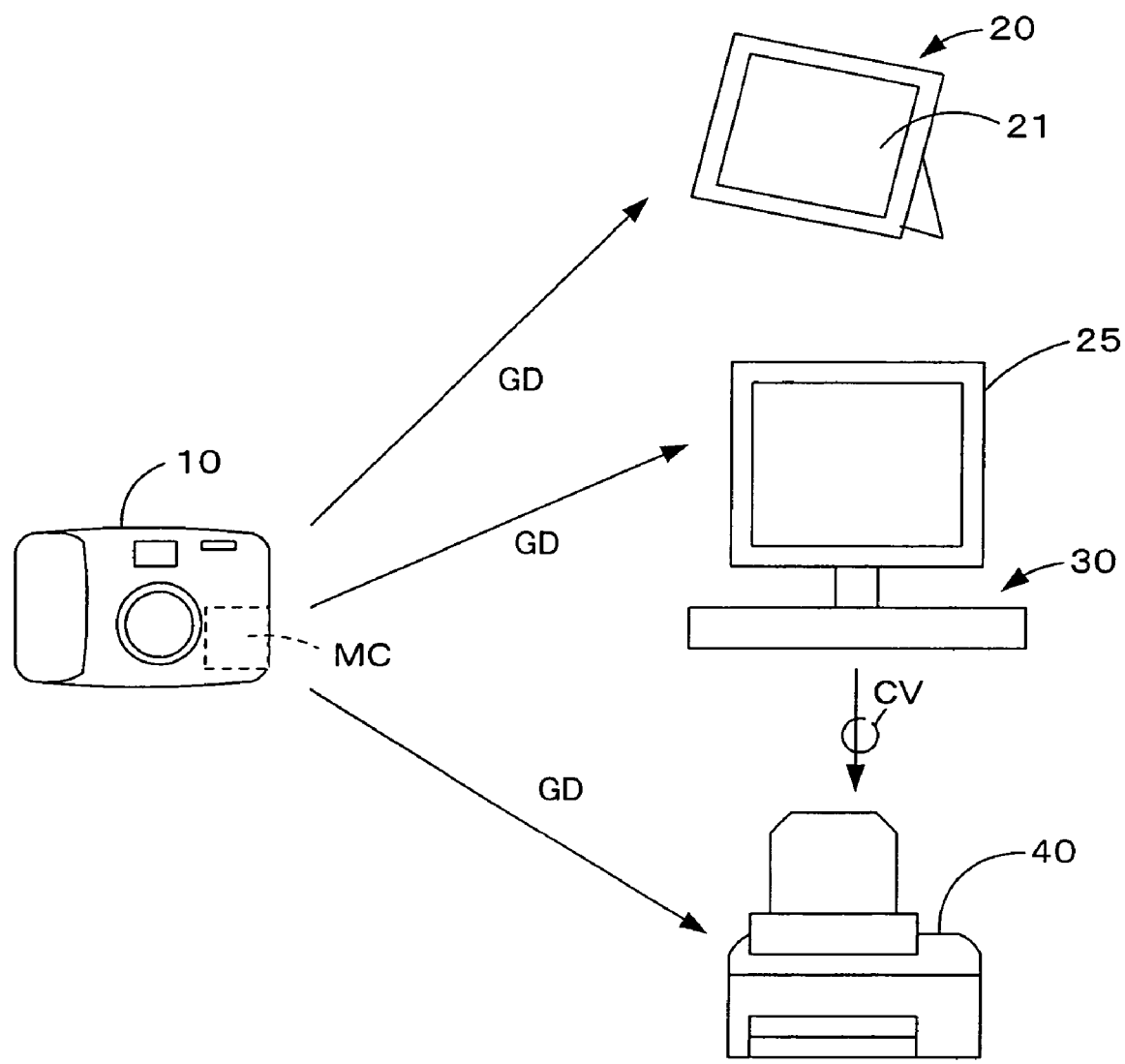
FIG. 1 illustrates the general structure of an image processing system including the image processing apparatus in this example.
Figure 2:
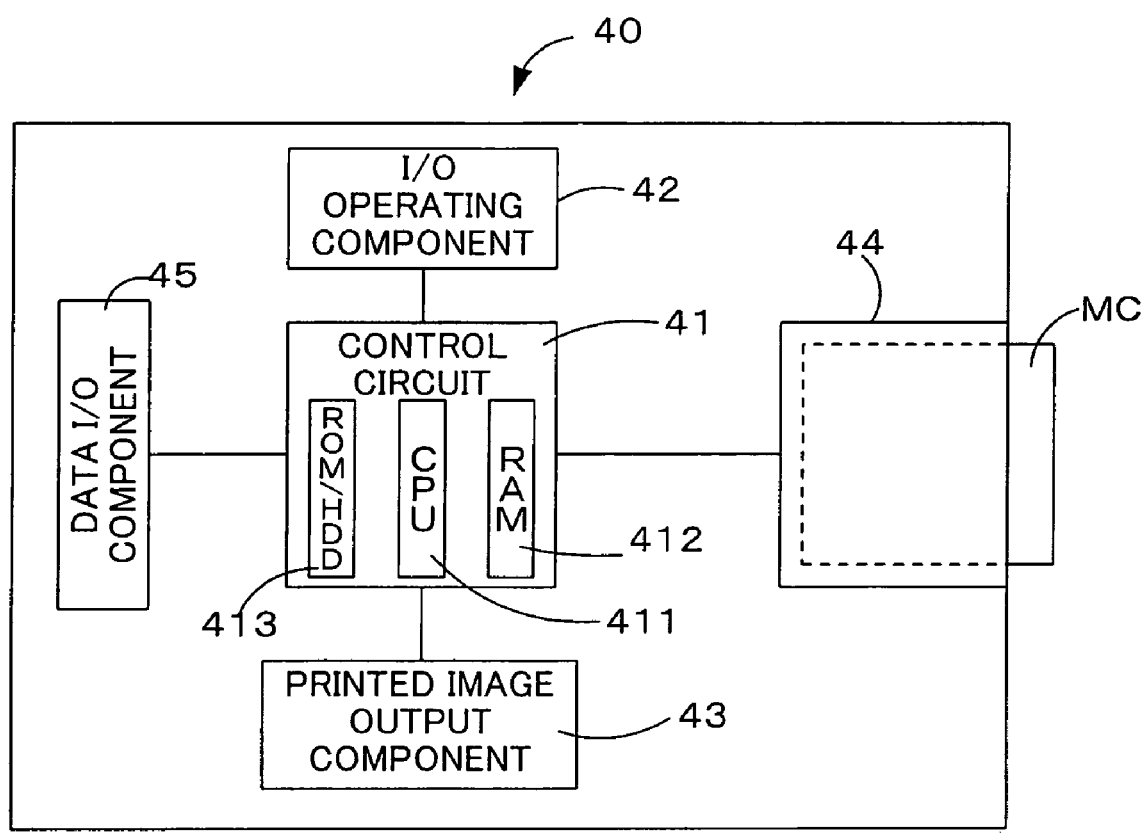
FIG. 2 illustrates the general structure of the image processing apparatus in this example.

An image processing system including the image processing apparatus of this embodiment is illustrated with reference to FIGS. 1 and 2. FIG. 1 illustrates the general structure of an image processing system including the image processing apparatus in this embodiment. FIG. 2 illustrates the general structure of the image processing apparatus in this embodiment.

The image processing system comprises a digital still camera 10 as a image data generating device, a display device 20 as the image processing apparatus for implementing the image process on the image data GD, a personal computer 30, and color printer 40.

The digital still camera 10 is a camera that obtains (generates) digital image data by focusing light data on a digital device (photoelectric transducers known as CCD or photoelectric multipliers). The digital still camera 10 comprises, for example, a CCD in which R, G, and B filters are disposed according to specific rules for each structural pixel, and generates digital image data corresponding to the photographed subject. More specifically, R component pixel data is directly obtained in pixels with R filters, while G and B component pixel data is generated by interpolation based on the surrounding pixel data. The generated image data is stored in a memory card MC serving as a storage device. Examples of formats for storing image data in digital still cameras 10 include the JPEG data format as an irreversible compression storage format, and the TIFF data format as a reversible compression storage format, but other storage formats which may be used include the RAW data format, GIF data format, and BMP data format. Imaging devices such as scanners may also be used as the image data generating device.

The display device 20 functions as an electronic photograph frame, for example, having a display 21 for displaying images, and displays output images by stand-alone processing of the color image data by the same image processing as the image processing in the color printer 40 described below. The display device 20 obtains image data from a digital still camera 10 or server on a network (not shown) through cables, for example, or through wireless communications such as IR communications or radiowave communications, and recording media. The display 21 is, for example, a liquid crystal display or organic EL display, and has the property of independent image output on each display panel.

The personal computer 30 is, for example, a general purpose type of computer, comprising a CPU, RAM, and hard disk, and executes image processes similar to the image processes in the color printer 40 described below. The personal computer 30 also comprises a memory card slot for the installation of a memory card MC, and I/O terminals to connect cables from the digital still camera 10 or the like.

The color printer 40 is capable of outputting color images. In this embodiment, the color printer 40 stands alone and outputs images by running an image process on image data. As illustrated in FIG. 2, the color printer 40 comprises a control circuit 41, I/O operating component 42, printed image output component 43, memory card slot 44, and data I/O component 45.

The control circuit 41 comprises a central processing unit (CPU) 411 for running various computing processes such as image processing and analytical processes on image data, random access memory (RAM) 412 for temporarily storing various types of data such as image data which has undergone an image process and computer results, and a read-only memory (ROM)/hard disk drive (HDD) 413 for storing tables that show various parameters of the photographed subject determination conditions for identifying the main photographed subject, which is the photographed subject characterizing the image, and programs that are run by the CPU 111.

The I/O operating component 42 is an interface which receives external input, and may be realized in the form of a key operator, scroll operator, touch panel type operator, or the like.

The printed image output component 43 is an ink jet type of printed image output component that forms images by forming dot patterns by spraying four colors of ink comprising cyan (C), magenta (M), yellow (Y), and black (K), for example, onto print media based on the print image data output from the control circuit 41. Alternatively, it is an electronic copier type of printed image output device that forms images by transferring and fixing color toner on print media. In addition to the four colors noted above, the colored ink may include light cyan (LC), light magenta (LM), blue, and red.

The memory card slot 44 is a component for the installation of various memory cards. Reading and writing to the memory card installed in the memory card slot 14 are controlled by the control circuit 41.

The data I/O component 45 has terminals for connecting cable CV and the like, and a signal transforming process function, and is used for the exchange of image data with external devices.

Figure 3:
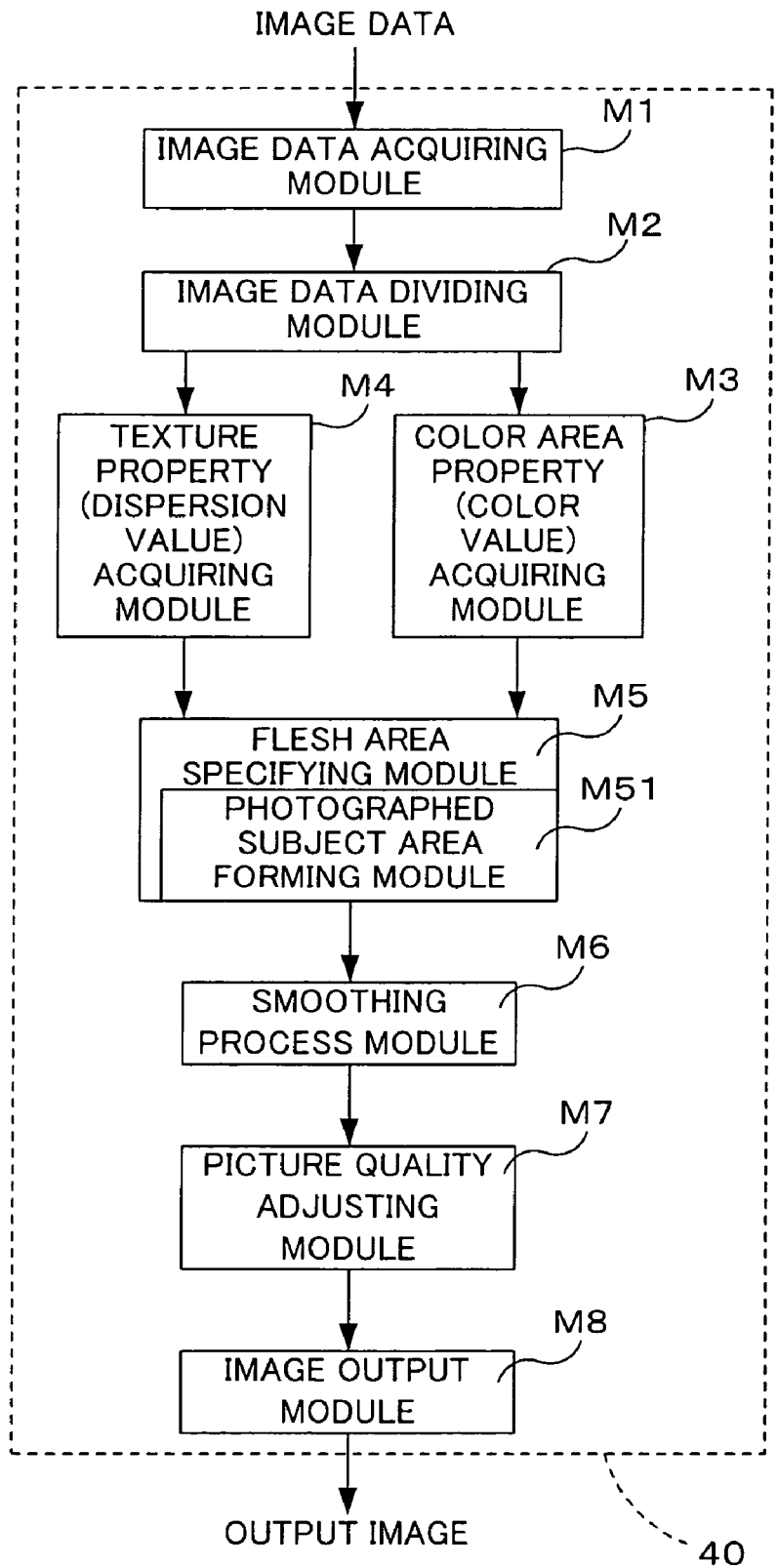
FIG. 3 is a block diagram of the functional modules realized by the control circuit 41 of the color printer 40 in the example.

An outline of the modules realized by the control circuit 41 of the color printer 40 is given below with reference to FIG. 3. FIG. 3 is a block diagram of the functional modules realized by the control circuit 41 of the color printer 40 in this embodiment. The modules illustrated in FIG. 3 may be realized in terms of the CPU 411 alone or the control circuit 41, and may be realized by either hardware or software.

The image data is acquired by the control circuit 41 by means of the image data acquiring module M1, and is sent to the image data dividing module M2.

The image data dividing module M2 divides the image data into a plurality of areas (plurality of pixel data groups). That is, image data is allocated to the areas that are obtained when the image is divided into a plurality of areas. The image areas are composed of 1 or more pixels, and the plurality of areas of the image data assigned to each area are composed of one or more pixel data. The texture property acquiring module M3 analyzes the image data in area units and acquires the texture properties of each area. The color area property acquiring module M4 analyzes the image data in area units and acquires the color area properties of each area. The texture property acquiring module M3 may be realized in the form of a dispersion value acquiring module, and the color area property acquiring module M4 may be realized in the form of a color area property acquiring module.

The flesh area determining module M5 specifies areas corresponding to flesh areas among the areas of the image data using the acquired texture properties and the acquired color area properties. Areas exhibiting smooth texture properties and the color area properties of flesh tones, for example, are identified as flesh areas by the determining module M5. The flesh area determining module M5 may also comprise a photographed subject are forming module M51 that forms photographed subject areas by associating adjacent image data areas exhibiting the same color area properties and texture properties. In this case, the flesh area determining module M5 determines flesh areas in photographed subject area units.

the smoothing process module M6 executes a smooth process on the areas of the image data determined to be flesh areas. The picture quality adjusting module M7 executes a picture quality adjusting process targeting all image data on the image data which has undergone the smoothing process in area units. The image output module M8 outputs the output image using image data in which the adjusted picture quality.

Figure 4:
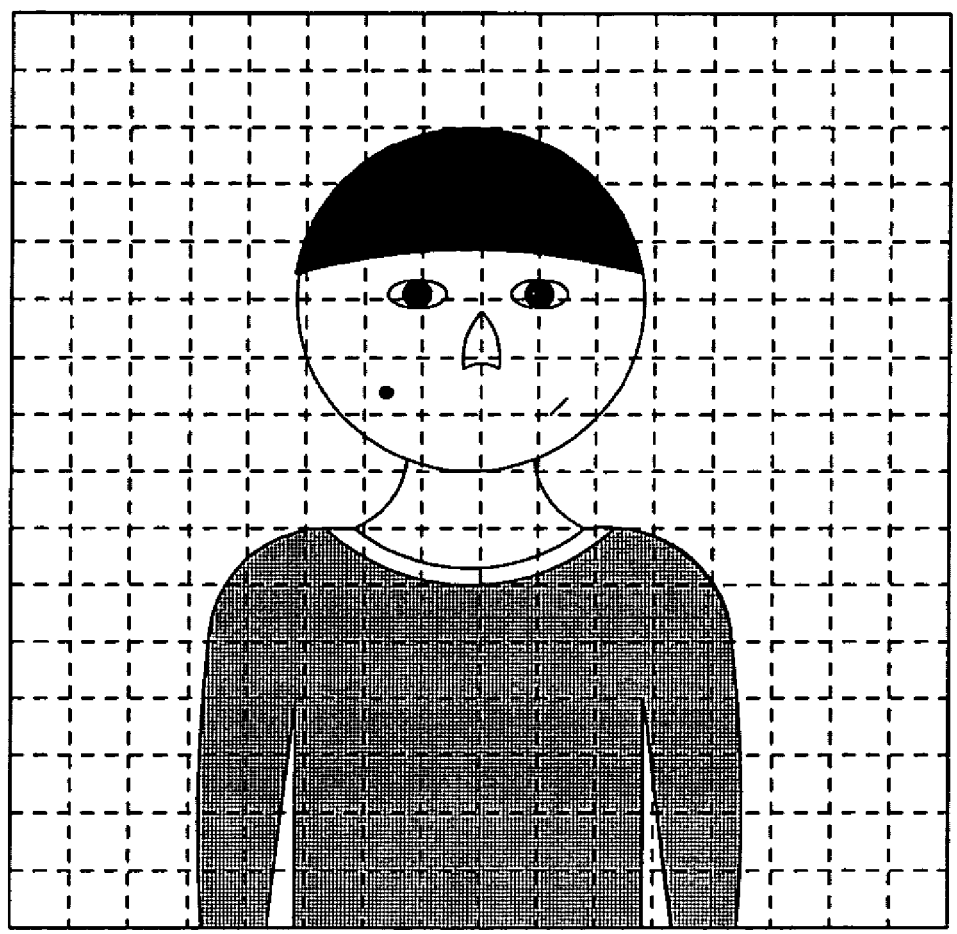
FIG. 4 schematically illustrates an example of a targeted image.
Figure 5:
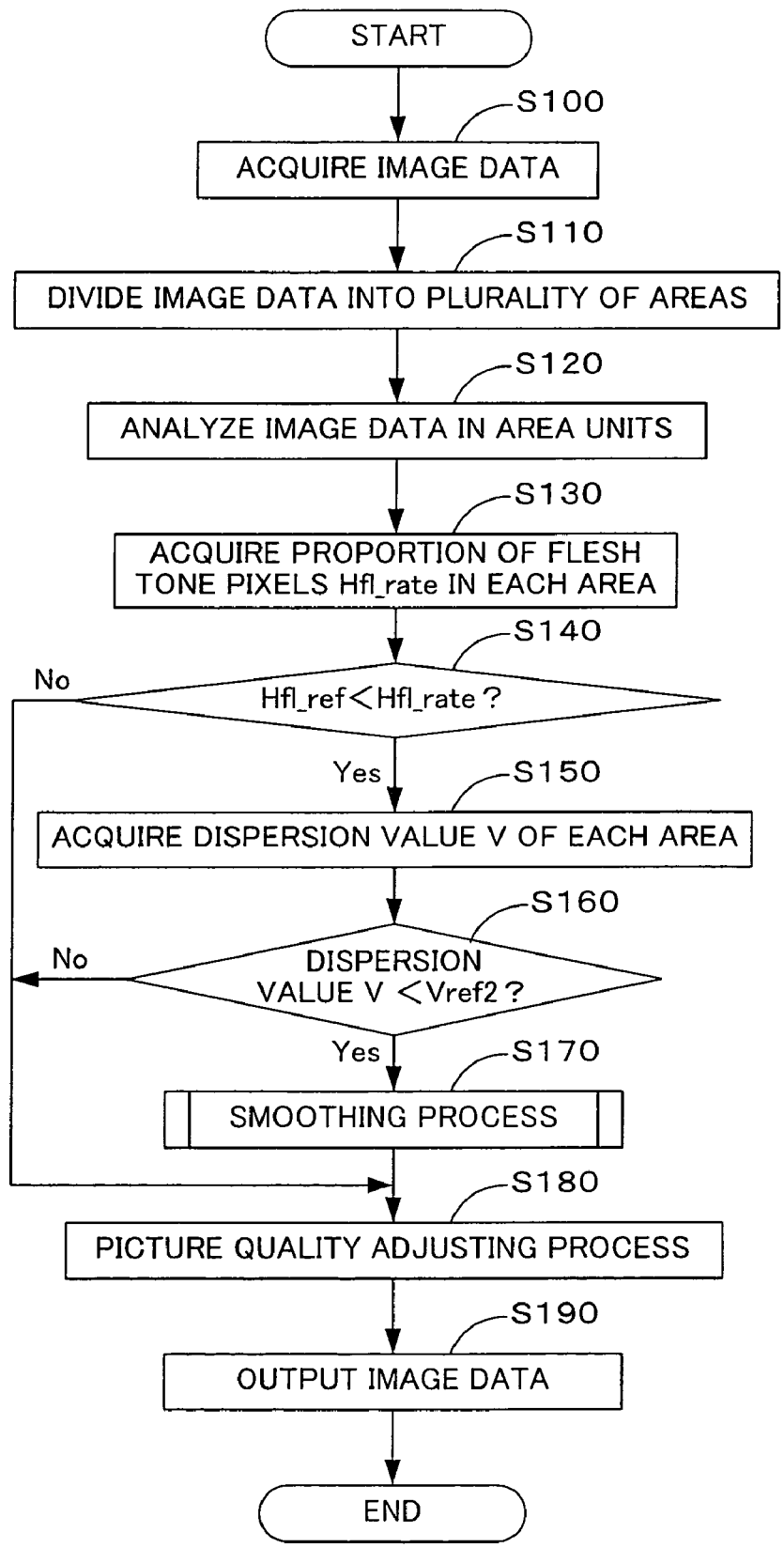
FIG. 5 is a flow chart of the process routine in a process for determining flesh areas which is carried out by the color printer in the example.
Figure 6:
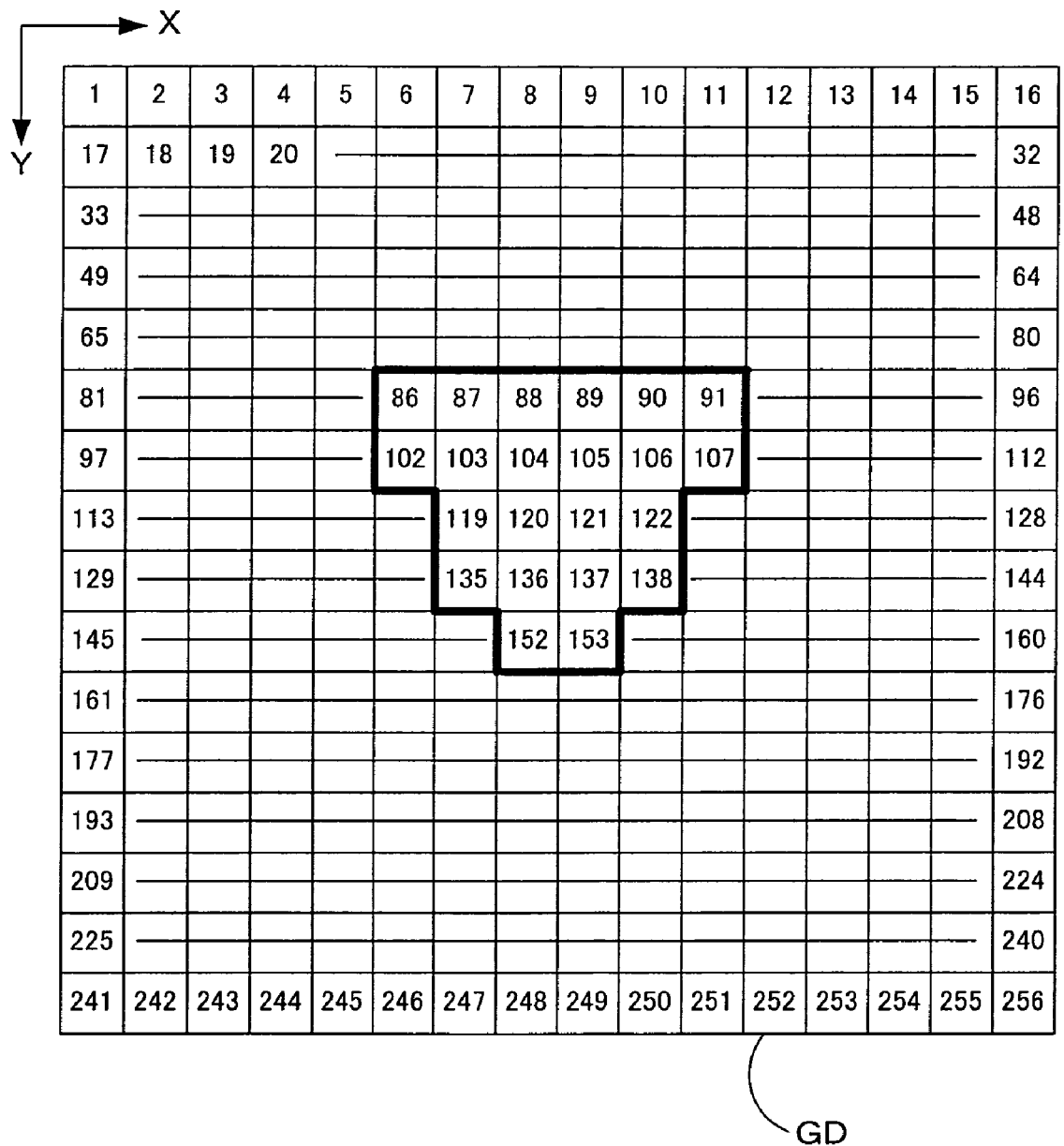
FIG. 6 schematically illustrates the course of the process for determining flesh areas which is carried out by the color printer in the example.
Figure 7:
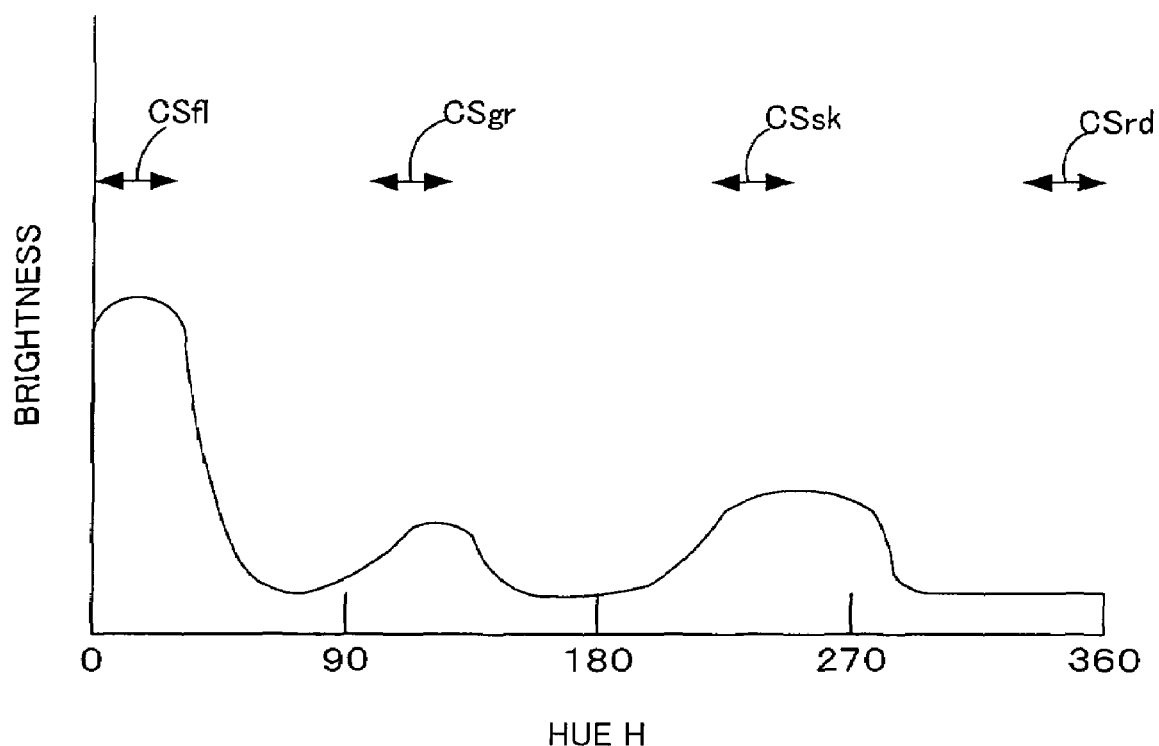
FIG. 7 illustrates an example of the results of analysis of image data areas (pixel data groups).

The process for identifying flesh tone areas carried out by the color printer 40 as the image processing apparatus in this embodiment will be described with reference to FIGS. 4 through 7. FIG. 4 schematically illustrates an example of a targeted image. FIG. 5 is a flow chart of the process routine in the process for determining flesh areas which is carried out by the color printer in the embodiment. FIG. 6 schematically illustrates the course of the process for determining flesh areas which is carried out by the color printer in the embodiment. FIG. 7 illustrates an example of the results of analysis of image data areas (pixel data groups).

The image data GD which is the target of the process routine is image data GD corresponding to the image illustrated in FIG. 4. The image in FIG. 4 has spots and blemishes in the flesh area (face area). The upper and lower parts of the image used in the following description indicate areas in FIG. 4.

The process routine in FIG. 5 starts, for example, when a memory card MC is inserted into the memory slot 44 of the color printer 40 or when a digital still camera 10 is connected to the color printer 40 by a cable CV.

When the image process is started, the control circuit 41 (CPU 411) acquires the selected image data GD and temporarily stores the selected image data GD in RAM 412 (Step S100). Since the image data GD generated in the digital still camera 10 is generally YCbCr data, the CPU 411 converts the YCbCr data to RGB data when the selected image data GD is opened. The image data GD may be selected, for example, on a digital still camera 10 connected with or without a line to the color printer 40, or the image data GD may be selected on the color printer 40 from the image data GD stored on the memory card MC. The image data GD may also be selected from a plurality of color image data GD stored on a server via a network.

The CPU 411 divides the selected image data GD into a plurality of areas, such as 256 (16×16) areas (pixel data groups), as illustrated in FIG. 6 (Step S110). To facilitate a better understanding, FIG. 6 schematically illustrates a virtual state in which image data GD is developed on memory. Specifically, the image data GD is composed of a plurality of pixel data. Location data represented by x-y coordinates, for example, are assigned in the image data. Virtual divided areas of the image data GD and divided areas of the image as illustrated in FIG. 6 are associated by using the location data to associate the plurality of areas into which the image is divided and the pixel data groups corresponding to the areas. In this embodiment, numbers 1 to 255 are assigned to the areas from the upper left to the lower right to differentiate the areas. In the present Specification, the dividing units of the image data GD that is divided in conjunction with the divided areas of the image are referred to as pixel data groups or image data GD areas.

The CPU 411 analyzes the image data GD in area units (Step S120), calculates the proportion of flesh toned pixels H fl_rate, which is the proportion of the number of pixel data exhibiting flesh toned hues relative to the total number of pixel data forming the areas of the image data GD (Step S130), and determines whether or not the resulting proportion of flesh tone pixels H fl_rate is at or over the reference value H fl_ref for identifying the hue of the image data as being flesh toned (Step S140). Specifically, the CPU 411 converts RGB image data GD to HSV image data, for example, and produces a histogram of the hue, such as that illustrated in FIG. 7, in the area units of the image data. Here, HSV color space is color space representing the image data GD by means of hue, saturation, S, and brightness V. The hue H of the image data GD may otherwise be obtained by converting the image data GD to HSL color space. The following Equations (1) through (3) are used in the conversion of the RGB image data GD to HSV image data.

$$R = V max \quad H = \frac{\pi}{3}\left(\frac{G-B}{V max - V min}\right) \quad \text{Equation (1)}$$

$$G = V max \quad H = \frac{\pi}{3}\left(2 + \frac{B-R}{V max - V min}\right) \quad \text{Equation (2)}$$

$$B = V max \quad H = \frac{\pi}{3}\left(4 + \frac{R-G}{V max - V min}\right) \quad \text{Equation (3)}$$

Here, V max=max {R, G, B}, and V min=min {R, G, B}. When V max=V min, the hue is indefinite (achromatic). When the hue H<0, $2\pi$ is added to the calculated hue H. As a result, the value range of the hue H is 0 to $2\pi$, but in this embodiment, the hue H is expressed with a value range of 0 to 360 degrees.

$$Hfl\_rate = \frac{\text{number of pixel data of flesh tone color areas}}{\text{number of total pixel data in areas}} \quad \text{Equation (4)}$$

In the histogram illustrated in FIG. 7, the hue range corresponding to flesh tones is CS fl, the hue range corresponding to green is CS gr, the hue range corresponding to sky blue is CS sk, and the hue range corresponding to red is CS rd. In the histogram illustrated in FIG. 7, the hue for flesh tones appears with high frequency, and it may be assumed that the analyzed image data areas corresponds to a photographed subject based on flesh.

When it is determined that the flesh tone pixel proportion H fl_rate≧the reference value H fl_ref (Step S140: Yes), the CPU 411 acquires the dispersion value V of those areas in the image data GD, and determines whether or not the acquired dispersion value V is less than the reference value V ref2 (Step S160).

When, on the other hand, it is determined that the flesh tone pixel proportion H fl_rate<the reference value H fl_ref (Step S140: No), the CPU 411 moves to the picture quality adjusting process (Step S180) without carrying out a smoothing process on the targeted image data areas.

Specifically, in the method for calculating the dispersion value, the dispersion values of the image data forming each area are calculated by the CPU 411 for the brightness component Y and color difference components Cb and Cr, and the greatest value is used as the dispersion value V of each area. The dispersion value V is determined by the following Equation (5). In the equation, xi indicates either the Y, Cb, or Cr component of the image data, and x indicates the mean value for the Y, Cb, or Cr component of all image data forming the areas.

$$V = \frac{1}{n}\sum_{i=1}^{n}(x_i - \bar{x})^2 \quad \text{Equation (5)}$$

When the acquired dispersion value V is determined to be lower than the dispersion reference value V ref2 (Step S160: Yes), the CPU 411 carries out the smoothing process (Step S170). When, on the other hand, the acquired dispersion value V is determined to be at or over the dispersion reference value V ref2 (Step S160: No), the CPU 411 moves to the picture quality adjusting process (Step S180) without performing a smoothing process on the targeted image data areas. In the embodiment illustrated in FIG. 6, image data areas 86 to 91, 102 to 107, 119 to 122, 135 to 138, and 152 and 153 are determined to correspond to flesh areas. The following smoothing process is carried out on the image data areas that are determined to be flesh areas.

Figure 8:
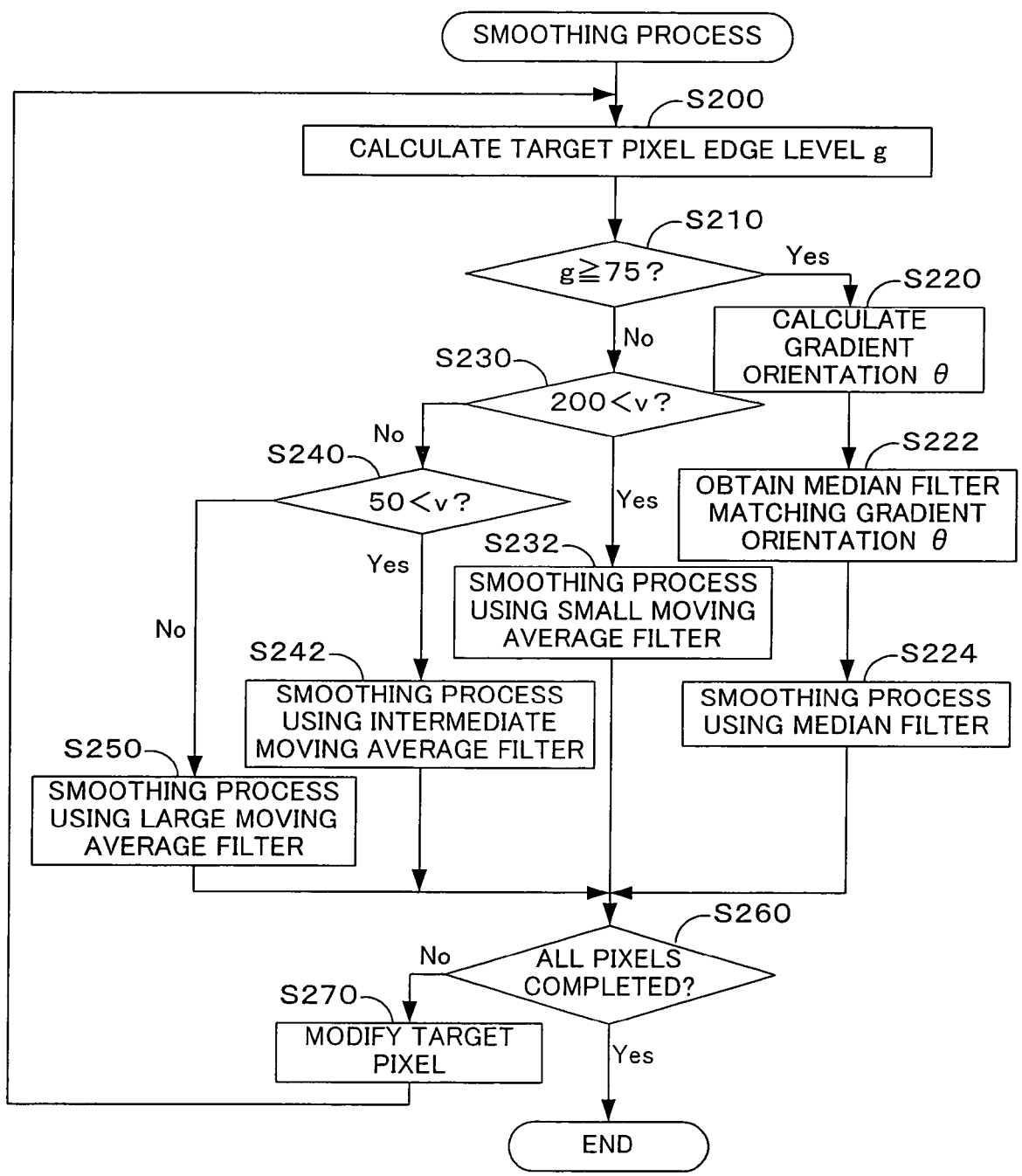
FIG. 8 is a flow chart of the process routine in a smoothing process which is carried out on image data areas corresponding to flesh areas.
Figure 11:
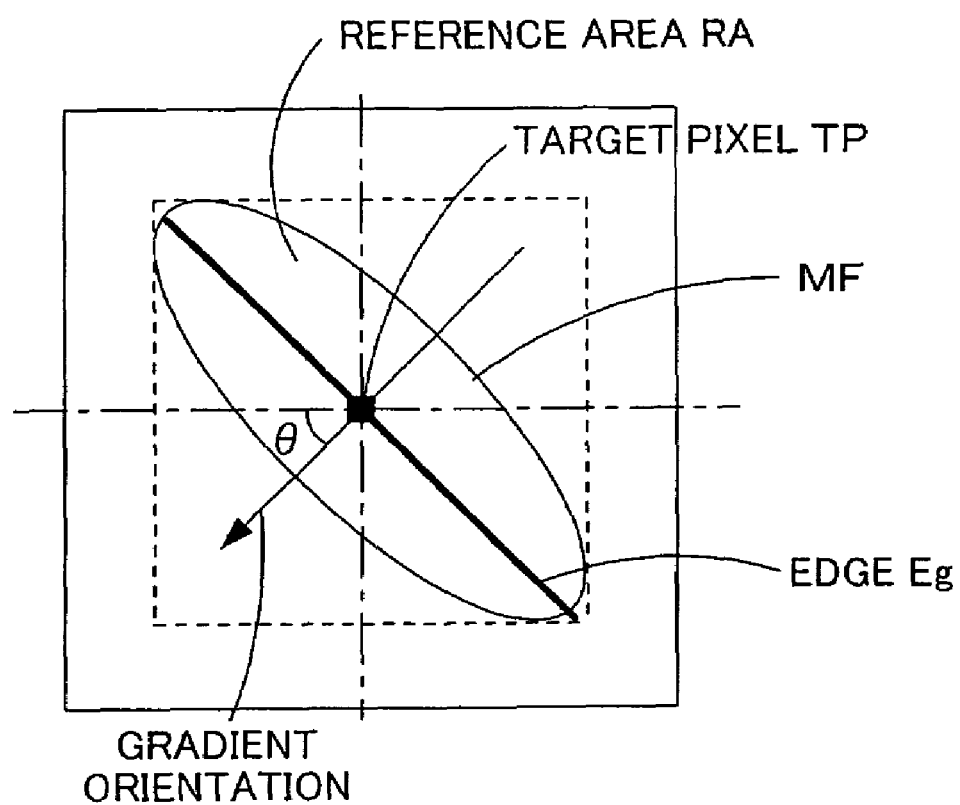
FIG. 11 illustrates characteristics of a smoothing process carried out by the image processing apparatus in this example on pixels forming the edges.
Figure 12A:
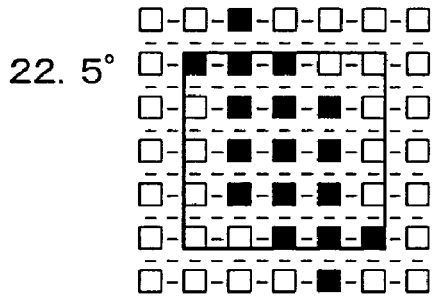
FIGS. 12(a) through 12(h) illustrate an example of an elliptical median filter with the orientation of the reference pixel extraction area used in the example.
Figure 12B:
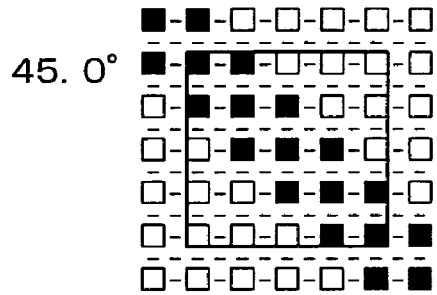
Figure 12C:
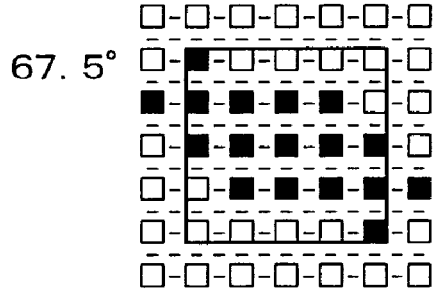
Figure 12D:
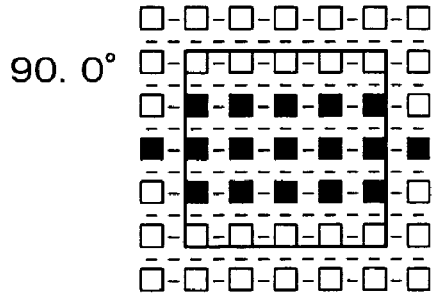
Figure 12E:
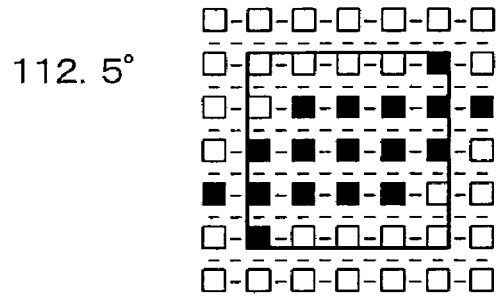
Figure 12F:
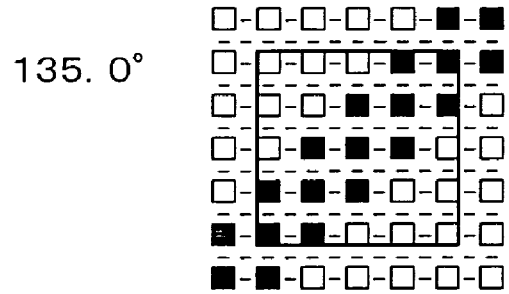
Figure 12G:
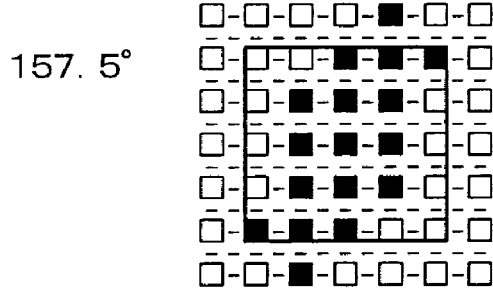
Figure 12H:
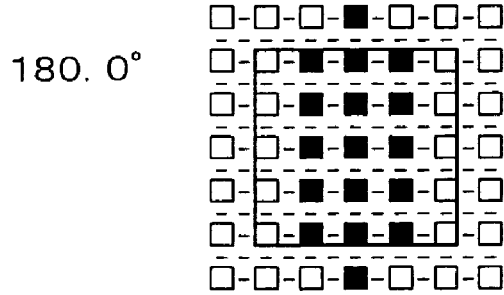
Figures 13, 14:
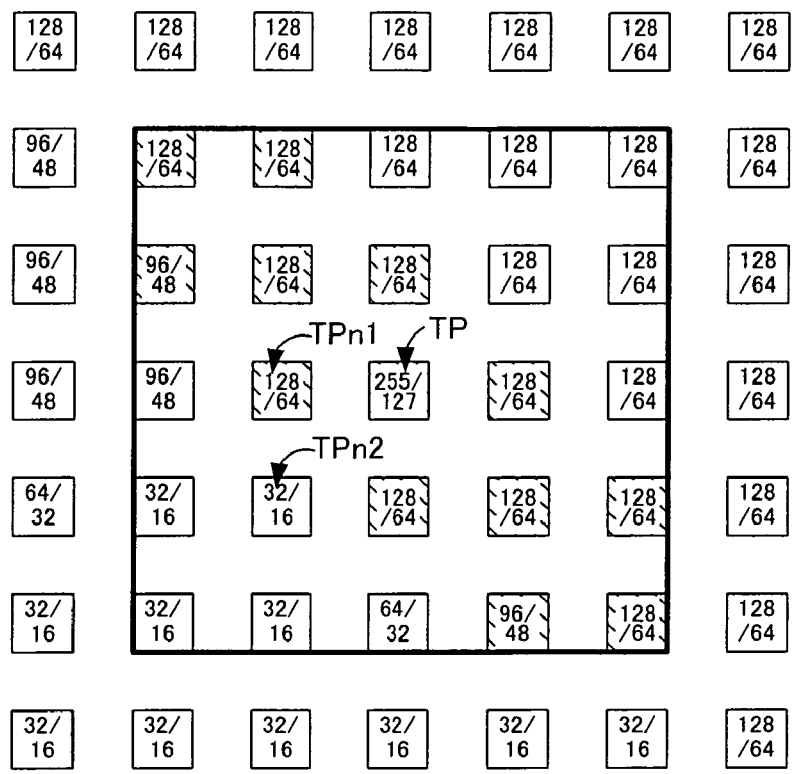
FIG. 13 is a hypothetical illustration of the application of a median filter during a smoothing process on target pixels TP, showing an exemplary distribution of pixel values in the image in FIG. 12 at the level of pixels.
FIG. 14 is a hypothetical illustration of the application of a median filter during the smoothing process on target pixel TPn1.
Figure 15:
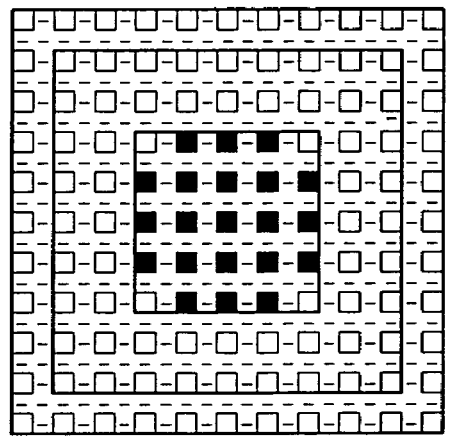
FIG. 15 is a hypothetical illustration of the application of a median filter during the smoothing process on target pixel TPn2.
Figure 16:
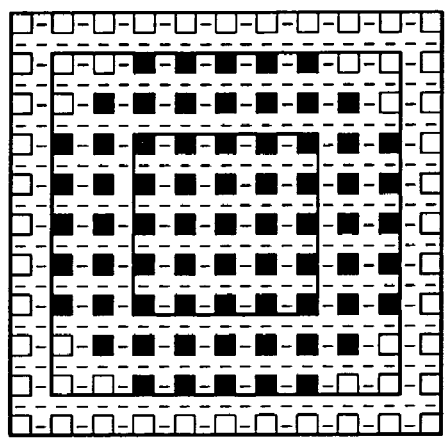
FIG. 16 illustrates an example of a 17×17 moving average filter used in the example.
Figure 17:
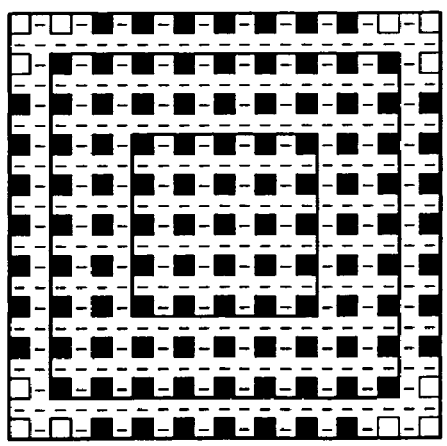
FIG. 17 illustrates an example of a 21×21 moving average filter used in the example.
Figure 18:
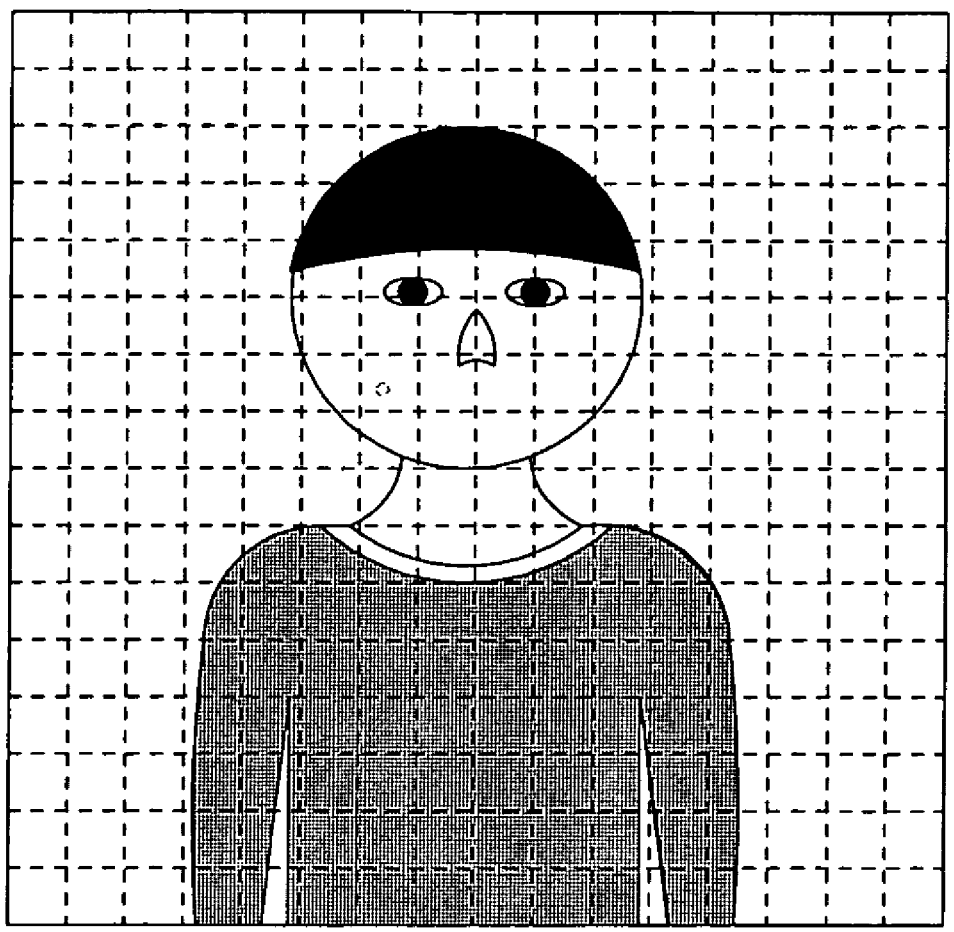
FIG. 18 schematically illustrates an image output as a result of the smoothing process in the example.

The smoothing process is described with reference to FIGS. 8 through 17. FIG. 8 is a flow chart of the process routine in the smoothing process which is carried out on image data areas corresponding to flesh areas. FIG. 9 illustrates an example of a 3×3 edge detection operator used to determine the edge gradient g (edge level). FIG. 10 illustrates an example of a 5×5 edge detection operator used to determine the edge gradient g (edge level). FIG. 11 illustrates characteristics of a smoothing process carried out by the image processing apparatus in this embodiment on pixels forming the edges. FIG. 12 illustrates an example of an elliptical median filter with the orientation of the reference pixel extraction area used in the embodiment. FIG. 13 is a hypothetical illustration of the application of a median filter during the smoothing process on target pixels TP, showing an exemplary distribution of pixel values in the image in FIG. 12 at the level of pixels. FIG. 14 is a hypothetical illustration of the application of the median filter during the smoothing process on target pixel TPn1. FIG. 15 is a hypothetical illustration of the application of the median filter during the smoothing process on target pixel TPn2. FIG. 16 illustrates an example of a 17×17 moving average filter used in the embodiment. FIG. 17 illustrates an example of a 21×21 moving average filter used in the embodiment. FIG. 18 schematically illustrates an image output as a result of the smoothing process in the embodiment.

When the smoothing process (noise reduction process) starts, the CPU 411 converts the color space of the targeted image data areas to a color coordinate system expressed by brightness and color difference components, such as YCbCr or Lab. YCbCr is used in this embodiment. Because the data which has already been treated is RGB data in this embodiment, the CPU 411 converts the RGB to YCbCr in the targeted image data areas using the following equation. No conversion process is particularly needed when YCbCr data is used to determine the above color areas.

$Y=0.2999R+0.587G+0.114B$ $Cr=0.713(R-Y) Cb=0.564(B-Y)$

The CPU 411 calculates the gradient (edge level) g of target pixels TP for each Y (brightness) and Cb and Cr (color difference) component (Step S200). Several procedures have already been established for calculating the edge level g. The 3×3 Prewitt operator shown in FIG. 9 and the 5×5 Prewitt operator shown in FIG. 10 are used in the description in this embodiment.

When the brightness component of the target pixel TP is expressed as Y (i,j), the CPU 411 calculates Δfx and Δfy using the following Equations (6) and (7). Equations (6) and (7) are examples of the use of the 3×3 Prewitt operator.

$\Delta fx=(Y(i+1,j-1)-Y(i-1,j-1))+(Y(i+1,j)-Y(i-1,j))+$
$\quad (Y(i+1,j+1)-Y(i-1,j+1))$ Equation (6)

$\Delta fy=(Y(i-1,j-1)-Y(i-1,j+1))+(Y(i,j-1)-Y(i,j+1))+$
$\quad (Y(i+1,j-1)-Y(i+1,j+1))$ Equation (7)

The CPU 411 then used the following Equation (8) to calculate the edge level g.

$$g=\sqrt{\Delta fx^2+\Delta fy^2} \quad \text{Equation (8)}$$

The CPU 411 determines the edge level for the Cr and Cb components in the same manner as for the Y component, and uses the greatest edge level g as the target pixel TP edge level g. An example of the use of the 3×3 Prewitt operator was used to facilitate a better understanding in the above embodiment, but the use of the 5×5 Prewitt operator as illustrated in FIG. 10 is preferred to determine the proper edge level g at the present point in time which is characterized by the use of a greater number of pixels to form image data.

The CPU 411 determines whether or not the calculated edge level g is 75 or higher (step S210). If it is determined to be 75≦g (step S210: Yes), then the edge angle θ is calculated (step S220). The CPU 411 calculates the edge angle based on Equation (9) below using the previously determined Δfx and Δfy.

$$\theta = \arctan\left(\frac{\Delta fy}{\Delta fx}\right) \quad \text{Equation (9)}$$

However, the angle θ actually calculated by Equation (8) is the orientation θ of the gradient relative to the horizontal direction as shown in FIG. 11, and is not, strictly speaking, the edge angle. Nevertheless, because the orientation of the gradient is perpendicular (90°) to the orientation of the edge, the gradient orientation θ and the edge orientation (edge angle) are uniquely related, allowing the edge angle to be determined by determining the gradient orientation θ.

The CPU 411 obtains a median filter matching the edge angle on the image based on the calculated gradient orientation θ (step S222). Median filters MF oriented to reference areas RA (reference pixels focused on pixels surrounding the edge), as illustrated in FIGS. 12(a) through (h), are stored in the ROM/HDD 413 of the color printer 40. The CPU 411 selects a median filter MF matching the edge angle on the image, using the calculated gradient orientation θ as an indicator. In this embodiment, median filters MF with 8 types of orientation in 22.5° increments within the range from 0° to 180° were prepared.

In FIG. 12, the black squares represent reference pixels, and the white pixels represent non-reference pixels, meaning skipped pixels which are not specified as target pixels (not targeted for smoothing). The angles in FIG. 12 indicate the gradient orientation θ, not the orientation of the median filter MF (the angle actually formed on the image). That is, the gradient orientation θ and the actual edge angle (orientation) are offset 90°, as noted earlier. In this embodiment, the gradient orientation θ and the actual edge angle have been coordinated so as to enable the selection of a median filter MF matching the edge angle on the image using the gradient orientation θ as an indicator in view of the differences noted above.

FIG. 12 illustrates an example of a median filter MF with a 9×9 angle for the sake of convenience, but the use of a 17×17 angled median filter MF will be preferable for actual processing.

The CPU 411 carries out the smoothing process using the obtained median filter MF (step S224). The smoothing process is carried out on the color difference components Cr and Cb, and the brightness component Y. In the embodiment given, an image having the edge illustrated in FIG. 11 has the pixel value (color value and brightness value) distribution illustrated in FIG. 13. Because the target pixel TP gradient orientation θ is 51°, the 45° median filter MF in FIG. 12(b) is selected to calculate the median filter.

The target pixels in FIG. 13 are represented by TP, TPn1, and TPn2. The reference pixels are the squares with the diagonal lines, and the non-reference pixels are represented by the white squares. The numerical values in the figure represent (brightness/color difference). Although there are pixels between the squares, they are not shown, since they are skipped pixels which are not treated as either target pixels or non-reference pixels, in order to speed up the image process.

Median values are calculated using the color difference or brightness of the reference pixels indicated by the diagonal lines and the brightness value or color value of the target pixel TP, giving the processed color difference and brightness values (processed color value) serving as the color value of the target pixel TP after the smoothing process. The CPU 411 temporarily stores the is processed color value obtained by these calculations in RAM 412.

In this embodiment, the target pixel TP had an initial color difference value of 127 and a brightness value of 255. Reference to the brightness values and color difference values of surrounding pixels could very likely suggest an edge component that was a large pigmentation spot, for example. When a conventional moving average filter is used, the color difference and brightness of all pixels within the frame are referenced. As a result, the processed brightness value and color difference value of the target pixel TP are 111 and 55, as illustrated in FIG. 14, and the edge component will become impaired by a smoothing process.

By contrast, in the smoothing process in this embodiment which features the use of an angled median filter MF, the processed color difference value and brightness value of the target pixel TP obtained using the color difference value and brightness value are 128 and 64, respectively, as illustrated in FIG. 14, allowing noise to be reduced without impairing the edge component. Because the smoothing process (median filter computation) is carried out by matching the reference area RA to the edge angle (edge orientation) so as to cover the edge-forming pixels, it is possible to implement a highly accurate noise reduction process that does not impair edges, while shortening the time for calculating the median filter, which normally takes a long time.

When the target pixel TP edge level g is less than 75 in step S210 (step S210: No), the CPU 411 carries out the smoothing process using a moving average filter. In general, when the dispersion value is high, it means that the image in the target area contains an abundance of high frequency components, that is, texture components. When the dispersion value v is low, it means that the image in the target area does not contain very many high frequency components (texture components). In other words, When the dispersion value V is low, the image in the target area is smooth, and when the dispersion value V is high, the image in the target area is coarse. The smoothing process is thus carried out in the following manner using a smaller moving average filter as the dispersion value V increases.

The CPU 411 determines whether or not the dispersion value V is greater than 200 (Step S230). If the dispersion value V is determined to be greater than 200 (Step S230: Yes), then the 9×9 moving average filter in FIG. 15, that is, a moving average filter with a small reference area having reference pixels within a 9×9 range, is used to carry out the smoothing process on the target pixel TP (Step S232). The CPU 411 temporarily stores the processed color value obtained by these calculations in RAM 412. The processed color value is obtained, for example, by obtaining the sum of the weighting factor multiplied by the color value (color difference value and brightness value) of each reference pixel according to the distance from the target pixel TP, and dividing the sum by the number of reference pixels.

In FIG. 15 as well, the black squares represent reference pixels, the white squares represent non-reference pixels, and the negative signs indicate skipped pixels. The moving average filter used in this embodiment should employ square pixels as reference pixels because the moving average filter has a reference area corresponding to the Gauss distribution, but in order to shorten the calculation time, square pixels that do not significantly affect the smoothing process are used empirically as non-reference pixels.

When the dispersion value V is 200 or less (Step S230: No), the CPU 411 determines whether or not the dispersion value V is greater than 50 (Step S240). If the dispersion value V is determined to be greater than 50 (Step S240: Yes), then the CPU 411 carries out the smoothing process on the target pixel TP using the 17×17 moving average filter having an intermediate reference area illustrated in FIG. 16 (Step S242). The CPU 411 temporarily stores the resulting processed color value in RAM 412. The black and white squares and the negative signs in FIG. 16 mean the same as above.

When the dispersion value V is determined to be 50 or less (Step S240: No), the CPU 411 uses the 21×21 moving average filter with a large reference area in FIG. 17 to carry out the smoothing process on the target pixel TP (Step S250). The CPU 411 temporarily stores the resulting processed color value in RAM 412. In this case, it means that relatively uniform pixels representing flesh, for example, are around the target pixel TP. As a result, a filter with a large reference area is used to increase the degree of smoothing to carry out a more powerful smoothing process with more emphasis on smoothing. The black and white squares and the negative signs in FIG. 17 mean the same as above.

When the any of the above smoothing processes on the current target pixel TP is concluded, the CPU 411 determines whether the smoothing process has been completed on all pixels in the targeted image data area (except for skipped pixels) (Step S260). If it is determined that not all pixels (except skipped pixels) have completed the smoothing process (Step S260: No), then the target pixel TP is changed (Step S270), and the process returns to Step 200 to implement the above smoothing processes on the next target pixel TP. If, on the other hand, the CPU 411 determines that all pixels (except skipped pixels) have completed the smoothing process (step S260: Yes), the smoothing process is complete. The above smoothing process may eliminate spots and blemishes, such as in FIG. 18, for example, without blurring the nose or large furrows.

The CPU 411 uses the processed color value for the image data temporarily stored in RAM 412 as the new color value of the corresponding image data, and converts the YCbCr data to RGB data.

The description will continue with reference to FIG. 5 again. The CPU 411 carries out other picture quality adjusting processes on all of the areas, or area units, of the image data (Step S180), and completes the process routine after output to a data conversion processing component such as a printer driver (Step S190). The printer driver (CPU 411) converts the RGB data to CMYK data as befits the printer color space, runs any necessary processes such as half tone processing, and then outputs the results in the form of raster data, for example, to a printed image output component 43.

As noted above, the color printer 40 serving as the image processing apparatus in this embodiment divides the image data into a plurality of areas, and uses the color value and dispersion (texture properties) for each image data area to determine whether or not areas correspond to flesh areas. Flesh areas may thus be more accurately determined. That is, when color areas of image data areas are included in flesh toned color areas, and the image data areas are smooth, those image data areas are determined to be flesh areas, making it possible to prevent or control coarse photographed subjects (regions) such as pink sweaters with color areas similar to flesh tones from being mistakenly determined as flesh areas.

The color printer 40 in this embodiment also carries out a smoothing process on image data areas specified as flesh areas, making it possible to reduce or eliminate parts where faithfully reproducing spots and blemishes in the flesh areas would be undesirable. It is thus possible to obtain output images with attractive flesh areas. It is also possible to more accurately identify flesh areas, and to avoid carrying out a smoothing process on areas that are not flesh areas.

Other Embodiments

Figure 19:
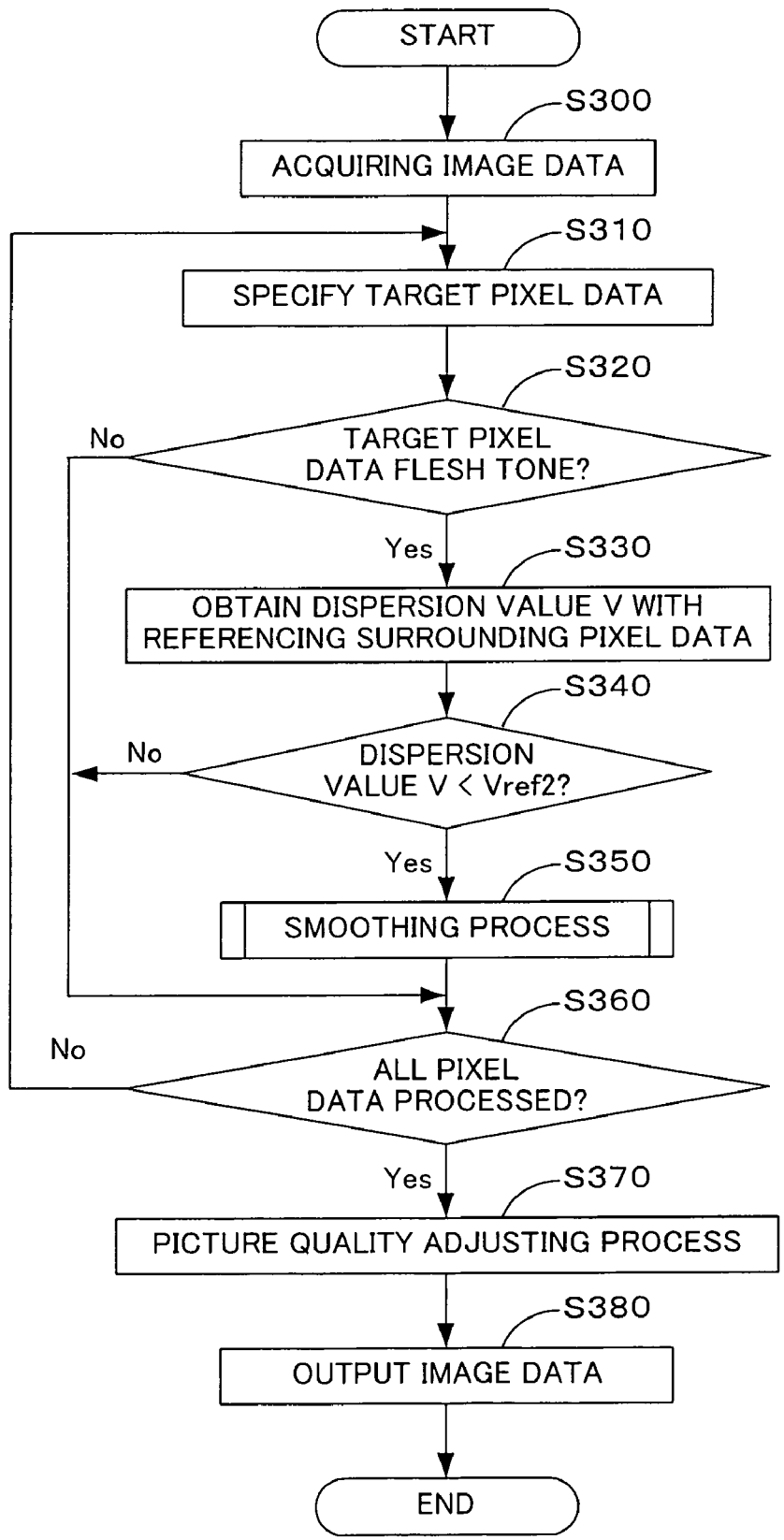
FIG. 19 is a flow chart of the process routine in a process for determining flesh areas carried out by the color printer in another example.

1) In the above embodiment, a smoothing process was carried out upon the determination of the presence or absence of a smoothing process in area units composed of a plurality of image data, but a smoothing process may also be carried out upon the determination of the presence of absence of a smoothing process in pixel data units, as illustrated in FIG. 19. FIG. 19 is a flow chart of the process routine in a process for determining flesh areas carried out by the color printer in another embodiment.

The process routine in FIG. 19 starts, for example, when a memory card MC is inserted into the memory slot 44 of the color printer 40 or when a digital still camera 10 is connected to the color printer 40 by a cable CV. Steps similar to the steps in FIG. 5 will be described briefly.

When the image process is started, the control circuit 41 (CPU 411) acquirees the selected image data GD and temporarily stores it in RAM 412 (Step S300). The process is the same as Step S100 in FIG. 5.

The CPU 411 specifies the target pixel data included in the selected image data GD (Step S310). All the pixel data forming the image data GD may be specified, or skipped pixel data composed of pixel data selected in intervals of every other one or more from the total pixel data forming the image data GD may be specified.

The CPU 411 determines whether or not the specified target pixel data exhibits flesh tone color values (Step S320). When it is determined that they do not exhibit flesh tone color values (Step S320: No), the process moves on to Step S360. RGB components exhibited by the target pixel data may serve as the basis in determining whether or not the target pixel data has flesh tone color values, or the RGB components of the target pixel data may be converted to HSV components as described above to make determinations based on the hue H.

When the specified target pixel data is determined to exhibit flesh tone color values (Step S320: Yes), the CPU 411 references the pixel data surrounding the target pixel data to obtain the dispersion value V (Step S330). The CPU 411 determines whether the obtained dispersion value V is less than the reference value V ref2 (Step S340). All the pixel data forming the image data is used to calculate the dispersion value. The method for calculating the dispersion value was described previously.

When it is determined that the obtained dispersion value V is less than the reference value V ref2 (Step S340: Yes), the CPU 411 carries out a smoothing process (Step S350). The smoothing process has already been described and will not be further elaborated. When, on the other hand, it is determined that the obtained dispersion value V is at or over the reference value V ref2 (Step S340: No), the CPU 411 returns to Step S360 without carrying out a smoothing process on the targeted graphic range.

In Step S360, the CPU 411 determines whether the process from Steps S310 to S350 have been completed on all pixel data targeted for processing. When it is determined that the process has not been completed on all targeted pixel data (Step S360: No), the next target pixel data is specified, and Steps S320 through S350 are carried out.

When it is determined that the process has been completed on all targeted pixel data (Step S360: Yes), other picture quality adjusting processes are carried out (Step S370), followed by output to a data conversion process component such as a printer driver (Step S380), and the process routine is complete. The printer driver (CPU 411) converts the RGB data to CMYK data as befits the printer color space, runs any necessary processes such as half tone processing, and then outputs the results in the form of raster data, for example, to a printed image output component 43.

When a smoothing process is carried out as needed upon the determination of the presence or absence of a smoothing process by the above process, it is carried out in pixel data units, allowing the presence or absence of the smoothing process to be determined more rapidly.

2) In the above embodiment, the determination of whether or not the color value of the image data areas is included in flesh tone color areas takes place in HCV color space, but it may also take place in RGB or YCbCr color space. In such cases, the determination is made based on whether or not the RGB color components of the image data areas is included in the flesh tone RGB value range, or whether or not the color difference components Cb and Cr exhibit flesh tone color differences.

3) In the above embodiment, the smoothing process was carried out simultaneously for both color difference and brightness using the same reference dispersion value in consideration of the variability of the color difference and brightness components during the smoothing process, but smoothing processes may also be carried out separately for the color difference and brightness. In such cases, a reference dispersion value for color difference and a reference dispersion value for brightness are each prepared to permit smoothing processes individually reflecting the color difference variability and the brightness variability as a result of the smoothing processes. It is thus possible to make images obtained by the smoothing processes look more attractive.

4) In the above embodiment, flesh tone areas were specified in image data area units, but adjacent areas with the same color values and dispersion values may be associated to form photographed subject areas, and flesh areas may be specified in the resulting photographed subject area units. In such cases, the size of the photographed subject area may be taken into consideration to further improve the accuracy in determining face areas where image data areas corresponding to flesh areas are concentrated.

5) In the above embodiment, the median filter and moving average filter were used separately during smooth processes on image data areas corresponding to flesh areas, but it is also possible to use just the moving average filter. In such cases, the use of moving average filters having large reference areas is preferred.

6) In the above embodiment, a color printer 40 was used as the image processing apparatus, but a display 20 and personal computer 30 may also be used. In such cases, the same effects as in the above embodiment may be obtained.

7) In the above embodiment, the image process was carried out with software, that is, in the form of a computer program, but it may also be carried out using image processing hardware circuitry comprising a logic circuit for implementing the above processes (steps). In such cases, the load on the CPU 411 may be alleviated, allowing the process to be completed more rapidly. The image process hardware circuit may be implemented as a circuit for the display device 20 and color printer 40, for example, and as an add-on card for the personal computer 30.

Image processing apparatus, image processing methods, and image processing programs of the invention have been described based on the above embodiment, but these embodiments of the invention were intended to facilitate an understanding of the invention and do not limit the invention. The invention may be modified and improved without departing from the spirit of the invention, and such equivalents are included in the invention.

What is claimed is:

1. An image processing method that specifies flesh area on an image, the image processing method comprising:
    acquiring image data that is data of the target image;
    dividing the image data into a plurality of image data areas;
    analyzing the image data in image data area units and for each image data area acquiring color area properties exhibited by the image data area;
    analyzing the image data in image data area units and for each image data area acquiring texture properties exhibited by the image data area, wherein the texture properties include a dispersion value as a parameter;
    specifying image data areas corresponding to flesh areas among the image data areas using the acquired color area properties and texture properties, the specifying of image data areas including forming photographed subject areas by associating adjacent image data areas exhibiting the same color area properties and texture properties, specifying image data areas corresponding to flesh areas by specifying photographed subject areas that exhibit flesh tone color area properties and smooth texture properties, the image data areas being composed of a plurality of pixel data, determining the color area properties of the image data areas are flesh toned when the proportion of the number of pixel data exhibiting flesh tone color areas relative to the total number of pixel data in the image data areas is at or over a color area reference value, and determining the texture properties of the image data areas are smooth when the dispersion value in the image data areas is lower than a dispersion reference value;
    calculating an edge level of a target pixel of the image data;
    calculating an edge angle of the target pixel; and
    smoothing the image data using a median filter corresponding to the calculated edge angle when the edge level is equal to or exceeds a predetermined value, and when the edge level is less than the predetermined value smoothing the image data using a small moving average filter when the dispersion value exceeds a first predetermined value, a medium moving average filter when the dispersion value is equal to or less than the first predetermined value and exceeds a second predetermined value, and a large moving average filter when the dispersion value is equal to or less than the second predetermined value,
    wherein each operation of the image processing method is executed by a microprocessor.

2. An image processing apparatus that specifies flesh area on an image, the image processing apparatus comprising:
    an image data acquiring module that acquires image data that is data of the target image;
    an image data dividing module that divides the image data into a plurality of image data areas;
    a color area property acquiring module that analyzes the image data in image data area units and for each image data area acquires color area properties exhibited by the image data area;
    a texture property acquiring module that analyzes the image data in image data area units and for each image data area acquires texture properties exhibited by the image data area, wherein the texture properties include a dispersion value as a parameter;
    a flesh area specifying module that specifies image data areas corresponding to flesh areas among the image data areas using the acquired color area properties and texture properties, and the flesh area specifying module including a photographed subject area forming module that forms photographed subject areas by associating adjacent image data areas exhibiting the same color area properties and texture properties, the flesh area specifying module specifying image data areas corresponding to flesh areas by specifying photographed subject areas that exhibit flesh tone color area properties and smooth texture properties, the image data areas being composed of a plurality of pixel data, the flesh area specifying module determining the color area properties of the image data areas are flesh toned when the proportion of the number of pixel data exhibiting flesh tone color areas relative to the total number of pixel data in the image data areas is at or over a color area reference value, and determining the texture properties of the image data areas are smooth when the dispersion value in the image data areas is lower than a dispersion reference value;
    an edge level calculating module that calculates an edge level of a target pixel of the image data;
    an edge angle calculating module that calculates an edge angle of the target pixel; and
    a smoothing module that smoothes the image data using a median filter corresponding to the calculated edge angle when the edge level is equal to or exceeds a predetermined value, and when the edge level is less than the predetermined value smoothes the image data using a small moving average filter when the dispersion value exceeds a first predetermined value, a medium moving average filter when the dispersion value is equal to or less than the first predetermined value and exceeds a second predetermined value, and a large moving average filter when the dispersion value is equal to or less than the second predetermined value.

3. An image processing apparatus according to claim 2, wherein the flesh area specifying module specifies, as image data areas corresponding to flesh areas, image data areas exhibiting flesh tone color area properties and smooth texture properties.

4. An image processing apparatus according to claim 3, wherein the color area properties include hue, saturation, and brightness as parameters.

5. An image processing apparatus according to claim 2, further comprising:
a smoothing process module that implements a smoothing process on image data areas corresponding to the specified flesh areas.

6. An image processing apparatus according to claim 2, wherein
each image data area is composed of one pixel datum.

7. An image processing apparatus according to claim 2, wherein
each image data area is composed of a plurality of pixel data.

8. An image processing method that specifies flesh area, the image processing method comprising:
acquiring image data composed of a plurality of pixel data;
dividing the image data into a plurality of pixel data groups;
analyzing the image data in pixel data group units and for each pixel data group acquiring, as the color value, the proportion of the number of pixel data exhibiting flesh tone color relative to the total number of pixel data in the pixel data group;
analyzing the image data in pixel data group units and for each pixel data group acquiring the dispersion value exhibited by the pixel data group;
specifying pixel data groups corresponding to flesh areas among the pixel data groups using the acquired color value and dispersion value, the specifying of pixel data groups including forming photographed subject areas by associating adjacent pixel data groups exhibiting the same color value and dispersion value, and specifying pixel data groups corresponding to flesh areas by specifying photographed subject areas in which the dispersion value is lower than a dispersion reference value and the proportion of the number of pixel data included in flesh toned color areas in the photographed subject areas, among the formed photographed areas, is at or over a color area reference value;
calculating an edge level of a target pixel of the image data;
calculating an edge angle of the target pixel; and
smoothing the image data using a median filter corresponding to the calculated edge angle when the edge level is equal to or exceeds a predetermined value, and when the edge level is less than the predetermined value smoothing the image data using a small moving average filter when the dispersion value exceeds a first predetermined value, a medium moving average filter when the dispersion value is equal to or less than the first predetermined value and exceeds a second predetermined value, and a large moving average filter when the dispersion value is equal to or less than the second predetermined value,
wherein each operation of the image processing method is executed by a microprocessor.

9. An image processing apparatus that specifies flesh areas, the image processing apparatus comprising:
an image data acquiring module that acquires image data composed of a plurality of pixel data;
an image data dividing module that divides the image data into a plurality of pixel data groups;
a color value acquiring module that analyzes the image data in pixel data group units and for each pixel data group acquires, as the color value, the proportion of the number of pixel data exhibiting flesh tone color relative to the total number of pixel data in the pixel data group;
a dispersion value acquiring module that analyzes the image data in pixel data group units and for each pixel data group acquires the dispersion value exhibited by the pixel data group;
a flesh area specifying module that specifies pixel data groups corresponding to flesh areas among the pixel data groups using the acquired color value and dispersion value, the flesh area specifying module including a photographed subject area forming module that forms photographed subject areas by associating adjacent pixel data groups exhibiting the same color value and dispersion value, and the flesh area specifying module specifying pixel data groups corresponding to flesh areas by specifying photographed subject areas in which the dispersion value is lower than a dispersion reference value and the proportion of the number of pixel data included in flesh toned color areas in the photographed subject areas, among the formed photographed areas, is at or over a color area reference value;
an edge level calculating module that calculates an edge level of a target pixel of the image data;
an edge angle calculating module that calculates an edge angle of the target pixel; and
a smoothing module that smoothes the image data using a median filter corresponding to the calculated edge angle when the edge level is equal to or exceeds a predetermined value, and when the edge level is less than the predetermined value smoothes the image data using a small moving average filter when the dispersion value exceeds a first predetermined value, a medium moving average filter when the dispersion value is equal to or less than the first predetermined value and exceeds a second predetermined value, and a large moving average filter when the dispersion value is equal to or less than the second predetermined value.

10. An image processing apparatus according to claim 9, wherein
pixel data groups with a color value at or over a color area reference value and a dispersion value lower than a dispersion reference value are specified as flesh areas by the flesh area specifying module.

11. An image processing apparatus according to claim 9, further comprising
a smoothing process module that implements a smoothing process on pixel data groups corresponding to the specified flesh areas.

* * * * *